US007525917B2

(12) United States Patent
Ferolito et al.

(10) Patent No.: US 7,525,917 B2
(45) Date of Patent: Apr. 28, 2009

(54) FLOW CONTROL IN A DISTRIBUTED SCALABLE, SHARED MEMORY SWITCHING FABRIC SYSTEM

(75) Inventors: Philip Ferolito, Sunnyvale, CA (US); Eric Anderson, Palo Alto, CA (US); Gregory S. Mathews, Santa Clara, CA (US)

(73) Assignee: Acatel-Lucent USA Inc., Murray Hill, NJ (US)

(*) Notice: Subject to any disclaimer, the term of this patent is extended or adjusted under 35 U.S.C. 154(b) by 1057 days.

(21) Appl. No.: 10/453,975

(22) Filed: Jun. 4, 2003

(65) Prior Publication Data

US 2003/0223448 A1 Dec. 4, 2003

Related U.S. Application Data

(60) Provisional application No. 60/385,981, filed on Jun. 4, 2002.

(51) Int. Cl.
*G01R 31/08* (2006.01)
*H04L 12/28* (2006.01)

(52) U.S. Cl. .................. 370/236.1; 370/236.2; 370/413

(58) Field of Classification Search ................. 370/235, 370/286, 418, 392, 230, 429, 399, 229, 231, 370/236, 236.1, 236.2, 412, 413
See application file for complete search history.

(56) References Cited

U.S. PATENT DOCUMENTS 5,517,495 A 5/1996 Lund et al.
5,790,522 A * 8/1998 Fichou et al. ............... 370/236
5,864,540 A 1/1999 Bonomi et al.
5,905,730 A 5/1999 Yang et al.
6,011,775 A 1/2000 Bonomi et al.
6,295,295 B1 * 9/2001 Wicklund ................... 370/392
6,324,165 B1 * 11/2001 Fan et al. ..................... 370/232
6,420,901 B2 * 7/2002 Liu et al. ....................... 326/38
6,487,213 B1 11/2002 Chao
6,657,962 B1 * 12/2003 Barri et al. .................. 370/235
6,683,884 B1 * 1/2004 Howard ...................... 370/412
6,687,255 B1 * 2/2004 Holm et al. ................. 370/412
6,721,273 B1 * 4/2004 Lyon .......................... 370/235
7,012,889 B1 * 3/2006 Turner et al. ................ 370/229
7,136,360 B2 * 11/2006 Voce et al. ............... 370/310.1
2002/0089977 A1 7/2002 Chang
2002/0136230 A1 * 9/2002 Dell et al. ................... 370/416
2003/0063604 A1 * 4/2003 Wallner et al. .............. 370/386

* cited by examiner

*Primary Examiner*—Seema S Rao
*Assistant Examiner*—Christine Duong

(57) ABSTRACT

A traffic control system and method with flow control aggregation. The system includes a switching fabric and an ingress module. The switching fabric includes read counters that are associated with a plurality of queues. The read counters represent an aggregated number of cells dequeued from respective queues since a previous flow control message (FCM) was sent to the ingress module. The read counters are reset when a FCM is created. The ingress module includes write counters that are associated with the queues. The write counters are incremented each time a cell is sent to the respective queues. The write counters are decremented in accordance with the FCM when the FCM is received. Also, read counters for one or more queues are aggregated into a single FCM.

13 Claims, 6 Drawing Sheets

FLOW CONTROL IN A DISTRIBUTED SCALABLE, SHARED MEMORY SWITCHING FABRIC SYSTEM

CROSS REFERENCE TO RELATED APPLICATION

This application is entitled to the benefit of provisional Patent Application Ser. No. 60/385,981, filed 4, Jun. 2002.

FIELD OF THE INVENTION

The present invention relates generally to packet-based traffic forwarding, and more particularly to flow control in a packet-based traffic forwarding system.

BACKGROUND OF THE INVENTION

Packet-switched networks are responsible for forwarding packet-based traffic. In some hardware devices, such as switches and routers, packets are broken into fixed-length cells and forwarded from an ingress, across a switching fabric, to an egress, where the cells are typically reassembled into packets.

For a system including a switching fabric with finite space, a cell may be forwarded from the ingress to the switching fabric at a time when the switching fabric is full. In this case, the system may have to drop the cell, resulting in data loss. Moreover, for a system including a scalable, shared memory switching fabric, when the size of the system increases, traffic control becomes increasingly difficult to manage.

In view of the desire to control flow in a scalable, shared memory switching fabric system, what is needed is a flow control mechanism that is efficient and scalable. It would also be advantageous to include additional flow control to ameliorate clock rate differences between the ingress or egress and switching fabric.

SUMMARY OF THE INVENTION

A technique for efficient flow control in a scalable, shared memory switching fabric system involves aggregating flow control messages (FCMs) at a flow control aggregation unit (FCA). A transmit module multiplexes the FCMs with other traffic to control the bandwidth ratio between traffic and FCMs, improving scalability. Aggregation may include aggregating a number of cells dequeued from each queue of a switching fabric as a read counter. Aggregation may also include aggregating a number of queues in a single FCM. Using aggregation techniques, the flow control overhead is kept low.

In an embodiment, a method of flow control in a scalable shared memory switching fabric system includes receiving cells from an ingress, enqueuing the cells in queues, dequeuing the cells from the queues, forwarding the cells to an egress, aggregating respective numbers of cells dequeued for each queue, sending in accordance with a scheduling algorithm a FCM to the ingress, and resetting the one or more respective numbers of cells dequeued.

In another embodiment, a method of flow control in a scalable shared memory switching fabric system includes associating write counters with respective destinations, sending a first cell associated with a first destination, incrementing a first write counter associated with the first destination, receiving a FCM including a first read count, and decrementing the first write counter in accordance with the first read count. An alternative embodiment includes incorporating the identity of a queue set into the FCM, wherein the queue set is a subplurality of the queues. Another alternative embodiment includes sending a second cell associated with a second destination, incrementing a second write counter associated with the second destination, and decrementing the second write counter in accordance with a second read count, wherein the receiving further includes receiving the second read count.

In another embodiment, a traffic flow control system includes a switching fabric, including queues for queuing cells, a flow control aggregation unit, and a scheduling module. The queues are respectively associated with write counters representing a number of cells enqueued in the queues and read counters representing a number of cells dequeued from the queues. The flow control aggregation unit, coupled to the queues, is configured to increment a first read counter when a first cell is dequeued from a first queue and create a FCM using the first read counter. The scheduling module is configured to schedule the FCM for transmission from the switching fabric. In an alternative embodiment, the system includes a packet processor module, coupled to the switching fabric, including an ingress module. The ingress module is configured to send the first cell to the switching fabric for enqueuing in the first queue, increment a first write counter associated with the first queue when the first cell is sent, receive the FCM, and decrement the first write counter according to the FCM. In another alternative, the system includes a packet processor module, coupled to the switching fabric, including an egress module. The egress module is configured to receive cells, including the first cell, and the FCM from the switching fabric, reassemble packets from the cells, including the first cell, and forward the FCM to the ingress module. In yet another alternative, the flow control aggregation unit includes an aggregation algorithm configured to include in the FCM a subplurality of the read counters associated with a respective subplurality of the queues.

Using the above-described techniques, efficient flow control in a scalable, shared memory switching fabric system is accomplished.

Exemplary figures illustrate embodiments of the invention that illustrate methods and systems for reassembling packets using cells received across a plurality of switching fabrics. Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
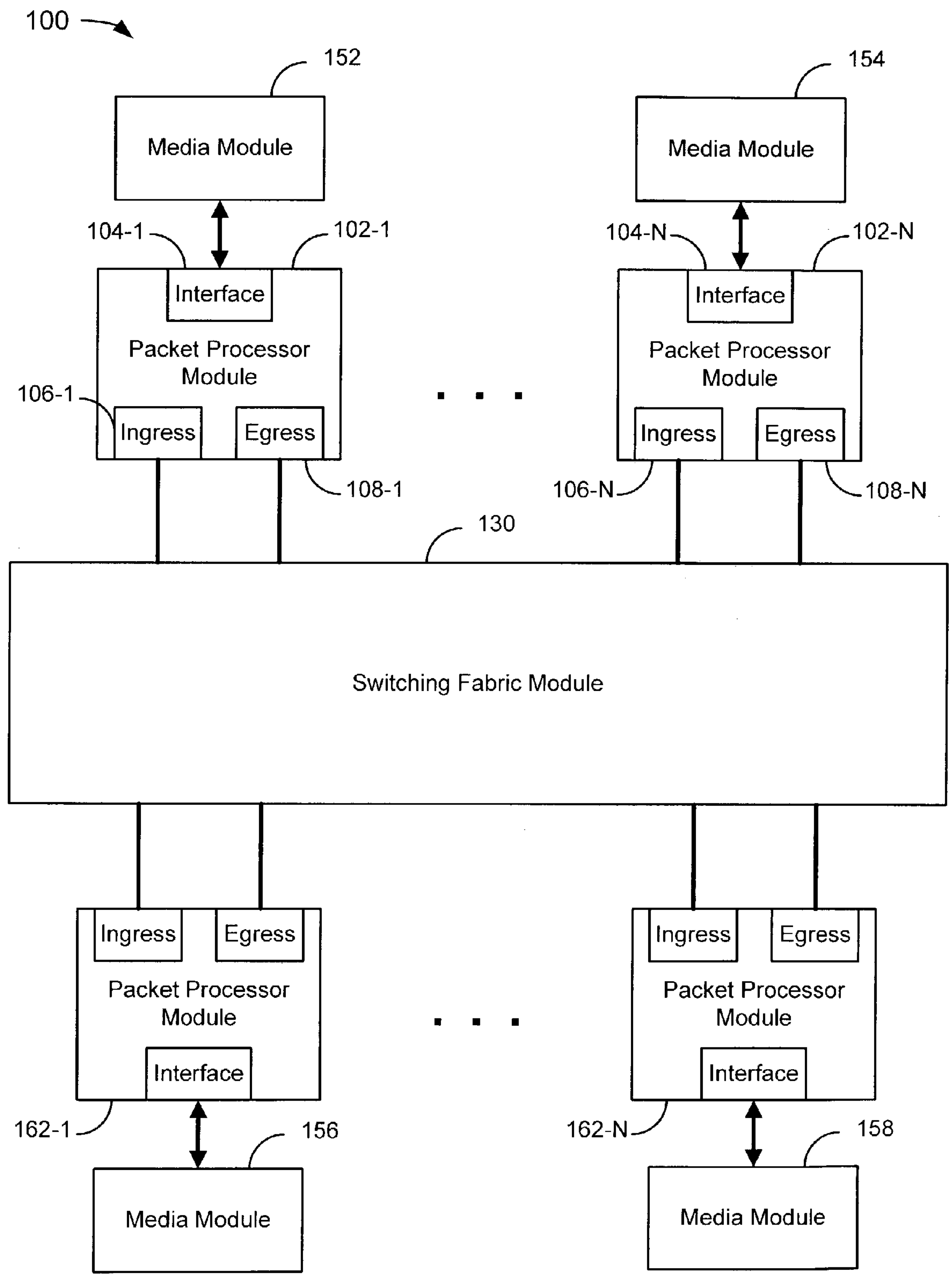
FIG. 1 is a block diagram of a traffic forwarding system in accordance with an embodiment of the invention.

As shown in the drawings for the purposes of illustration, an embodiment of the invention is a flow control system configured to facilitate the forwarding of traffic through a switching fabric.

FIG. 1 is a block diagram of a traffic forwarding system 100 in accordance with an embodiment of the invention. The system 100 includes media modules 152, 154, 156, and 158, packet processor modules 102-1 to 102-N (referred to collectively as the packet processor modules 102) and 162-1 to 162-N (referred to collectively as the packet processor modules 162), and switching fabric 130. The media modules 152, 154, 156, and 158 are respectively coupled to the packet processor modules 102-1, 102-N, 162-1, and 162-N. It should be noted that each packet processor module may be coupled to two or more media modules. The packet processor modules 102 and 162 are coupled to the switching fabric 130. The switching fabric 130 includes circuitry to replicate cells by writing to multiple buffers. This functionality may be used with multicast cells that target a plurality of destinations. The packet processor module 102-1 includes an interface module 104-1 for forwarding packets to and from the media module 152, an ingress module 106-1 for forwarding cells to the switching fabric 130, and an egress module 108-1 for receiving cells from the switching fabric 130. The packet processor modules 102 and 162 have comparable components and couplings. In an embodiment, the interface modules 104 are configured to receive packets. If a packet is too large to fit in a single cell, it is broken into portions and each portion is encapsulated in a separate cell. The system 100 handles traffic in discrete units, often referred to as datagrams. In an embodiment, the system 100 is an Ethernet switch or an Ethernet router that forwards traffic within the system 100 using Layer 2, Layer 3, and/or Layer 4 header information. The system 100 may include line cards that support network protocols such as Ethernet, ATM, and Frame Relay. Although an Ethernet-based switch/router is described, the disclosed cell reassembly techniques can be applied to any system that has multiple switching fabrics.

Figure 2:
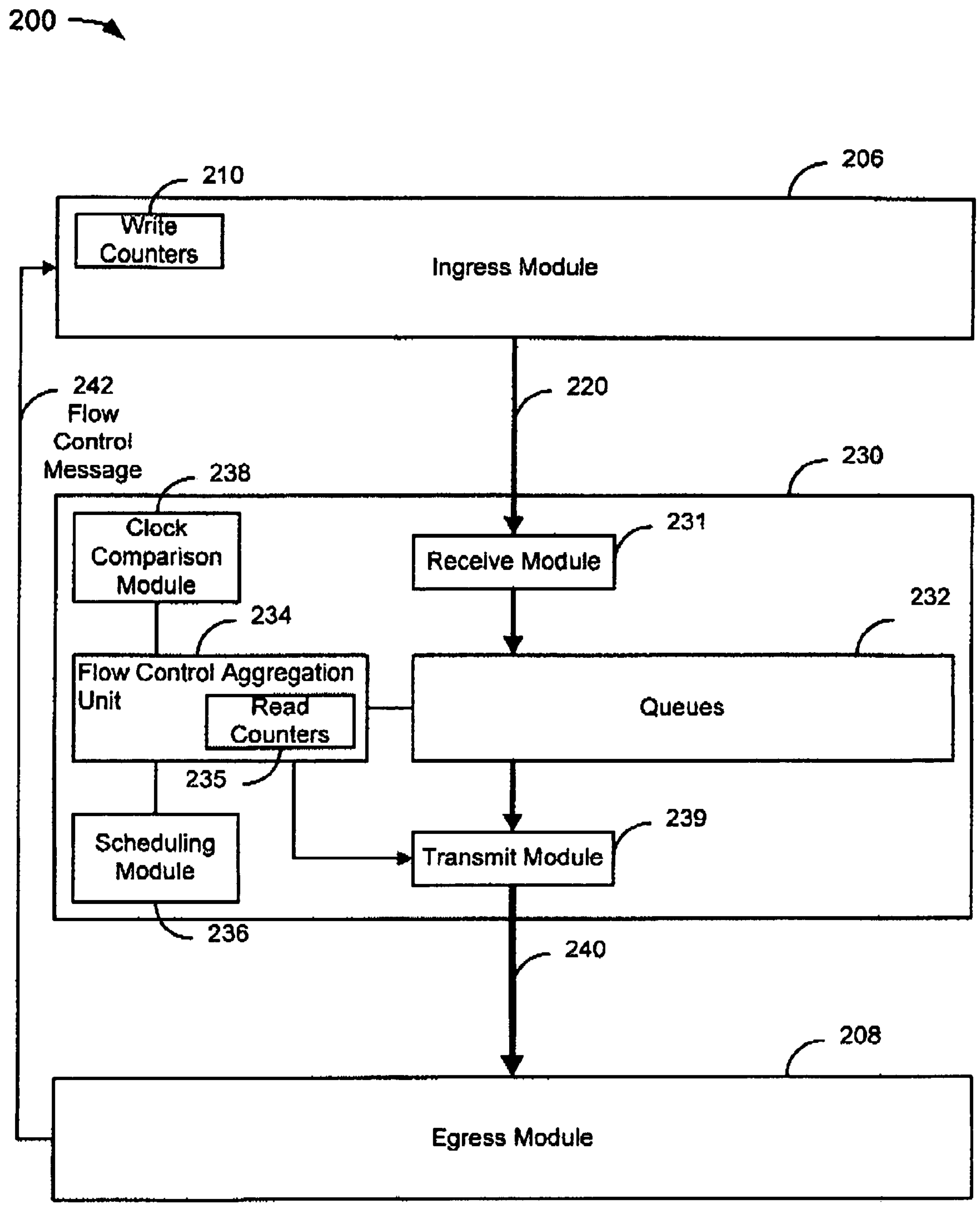
FIG. 2 is a block diagram of a traffic forwarding subsystem for use with the system of FIG. 1 in an embodiment of the invention.

FIG. 2 is a block diagram of a traffic forwarding subsystem 200 for use with the system 100 of FIG. 1 in an embodiment of the invention. The subsystem 200 includes an ingress module 206, an 8-bit bus 220, a switching fabric 230, a 10-bit bus 240, an egress module 208, and a 2-bit bus 242. The ingress module 206 includes write counters 210. The switching fabric 230 includes a receive module 231, queues 232, a flow control aggregation unit (FCA) 234, a scheduling module 236, a clock comparison module 238, and a transmit module 239. The FCA 234 includes read counters 235. The write counters 210 are respectively associated with the queues 232. The read counters 235 are also respectively associated with the queues 232. Each time a cell is sent from the ingress 206 to the switching fabric 230, the write counter associated with the queue to which the cell is sent is incremented. FIG. 2 is intended to illustrate an embodiment of the invention wherein the switching fabric 230 provides feedback to the ingress 206 in the form of a flow control message (FCM). The FCM is used to inform the ingress 206 how many cells that have been dequeued from the queues 232. When cells are dequeued from the queues 232, the read counter associated with the queue from which the cells are decremented is incremented. The read counter is then included in the FCM. By decrementing the write counters 210 by the read counters 235, the write counters 210 maintain an approximate count of the number of cells currently enqueued in the respectively associated queues 232. As illustrated in FIG. 1, in an embodiment, the ingress 106 and the egress 108 are on the same packet processor module 102. In this embodiment, where the subsystem 200 is used with the system 100 of FIG. 1, the switching fabric 230 sends the FCM to the egress 208 and the egress 208 forwards the FCM to the ingress 206.

The ingress module 206 sends cells from ingress queues (not shown) to the switching fabric 230 on the 8-bit bus 220. The 8-bit bus 220 may be a high-speed interface (HSI) bus. In order to ensure that the queues 232 are not full, the ingress module 206 consults the write counters 210. If a write counter exceeds a finite value that corresponds to the depth of an associated queue, then the ingress module 206 will not send a cell to the associated queue. Typically, the ingress module 206 will send another cell in accordance with an arbitration algorithm (not illustrated) that determines which one of a plurality of contending ingress queues is allowed to send a cell. A write counter of the write counters 210 is incremented each time a cell is sent from the ingress module 206. The write counter is associated with the queue of queues 232 to which the cell is directed.

The switching fabric 230 receives cells at the receive module 231 and buffers the cells in the queues 232. The FCA 234 aggregates the number of cells dequeued from each of the queues 232. The scheduling module 236 uses a scheduling algorithm to determine whether the FCA 234 is ready to send a FCM. Typically, the FCA 234 is allowed to send a FCM whenever bandwidth is available on the 10-bit bus 240. For example, when bandwidth is available, the FCA 234 sends an FCM each time a cell is dequeued from one of the queues 232. Conversely, the FCA 234 will wait, performing additional aggregation, when bandwidth becomes constrained. For example, when bandwidth is limited, the FCA 234 sends an FCM after two or more cells have been dequeued from one of the queues 232 (or sends an FCM after only one cell has been dequeued if bandwidth becomes available before a second cell is dequeued). Eventually, the FCA 234 provides a FCM to the transmit module 239. The queues 232 also provide cells to the transmit module 239. The FCM and cells are combined into a 10-bit encapsulated cell for transmission on the 10-bit bus 240. An exemplary format for the encapsulated cell is described later with reference to FIG. 3B. Since the switching fabric 230 is lossless in an embodiment, the switching fabric 230 should forward the cells sent to the switching fabric 230 on the 8-bit bus 220 onto the 10-bit bus 240. Since, in an embodiment, the 10-bit bus also includes the FCMs, the 10-bit bus 240 is configured to have more bandwidth than the 8-bit bus 220 (in this case, 10−8=2 bits more bandwidth). The egress module 208 receives the encapsulated cell and breaks the encapsulated cell into the (8-bit wide) cell and the FCM that were combined for transmission on the 10-bit bus 240. Packets are reassembled using the cell and the FCM is forwarded to the ingress module 206 on the 2-bit bus 242. When the ingress module 206 receives the FCM, the ingress module 206 reads the FCM and decrements the relevant write counters 210 in accordance with the FCM. In this way, the write counters 210 are reasonably accurate approximations of the fullness of the queues 232.

In an embodiment, the FCA 234 includes two aggregation procedures. The first procedure aggregates the number of cells that have been dequeued from a single one of the queues 232. For example, each aggregated message at the FCA 234 may represent 7 cells that were forwarded from a single one of the queues 232. This serves to compress the information that could less efficiently have been sent from the switching fabric 230 to the ingress 206 after each cell was forwarded. The second procedure aggregates messages by pairing messages from different queues. For example, each FCM from the switching fabric 230 to the ingress 206 may represent two messages from the first procedure, paired by the second procedure. This provides additional compression. Also, the duplication of information in each message requires less overhead. Moreover, manipulating the aggregation procedures allows continued scaling of the switching fabric 230 while keeping the flow control overhead constant. In an embodiment, FCMs take up 20% of bandwidth or less. As illustrated in FIG. 3B, described later, in an exemplary embodiment, FCMs take up 2 bits of a 10-bit field (i.e., 20% of bandwidth).

The clock comparison module 238 facilitates an additional form of flow control. The switching fabric 230 includes a clock, as do the ingress module 206 and egress module 208. If the ingress clock (not illustrated) is faster than the switching fabric clock (not illustrated), then it becomes possible for the ingress module 206 to send cells to the switching fabric 230 at a higher rate than the switching fabric 230 can manage. Accordingly, the clock comparison module 238 compares the ingress clock and switching fabric clock and provides a non-accumulative token to the FCA 234 that is included in a FCM. The token is non-accumulative because tokens received after a first token are ignored. When the ingress module 206 has the token, the ingress module 206 is allowed to send a cell to the switching fabric 230. On the other hand, when the ingress module 206 does not have the token, the ingress module 206 is not permitted to send a cell to the switching fabric 230. The non-accumulative token may be referred to as a write okay (WROK) flag because, from the perspective of the switching fabric 230, if the WROK flag is set then a cell may be written to one of the queues 232. Similar to the problem related to the speed of the switching fabric clock and the ingress clock, if the switching fabric clock is faster than the egress clock (not illustrated), then it becomes possible for the switching fabric 230 to send cells to the egress module 208 at a higher rate than the egress module 208 can manage. In this case, when the switching fabric 230 has the non-accumulative token, the switching fabric 230 is allowed to send a cell to the egress module 208. This non-accumulative token may be referred to as a read okay (RDOK) flag because, from the perspective of the switching fabric 230, if the RDOK flag is set then a cell may be read from one of the queues 232. The tables below may be useful for understanding how the clock comparison module 238 uses the ingress clock and the switching fabric clock to set the WROK flag. The setting of the RDOK flag by comparing the switching fabric clock and the egress clock is comparable.

TABLE 1 ingress clock speed = switching fabric clock speed × 2

| Time | ingress clock | switching fabric clock | WROK |
|---|---|---|---|
| t0 | 1 | 0 | 0 |
| t1 | 1 | 1 | 1 |
| t2 | 1 | 0 | 0 |
| t3 | 1 | 1 | 1 |

TABLE 2 ingress clock speed = switching fabric clock speed × 1.5

| Time | ingress clock | switching fabric clock | WROK |
|---|---|---|---|
| t0 | 1 | 0 | 0 |
| t1 | 1 | 1 | 1 |
| t2 | 1 | 1 | 1 |
| t3 | 1 | 0 | 0 |
| t4 | 1 | 1 | 1 |
| t5 | 1 | 1 | 1 |

With respect to Tables 1 and 2, Time represents the smallest time increment for which the ingress clock is always active. The WROK flag is set when the switching fabric clock is active (1). If the ingress clock speed is less than the switching fabric clock speed (not shown), then the WROK flag would always be set.

Figure 3A:
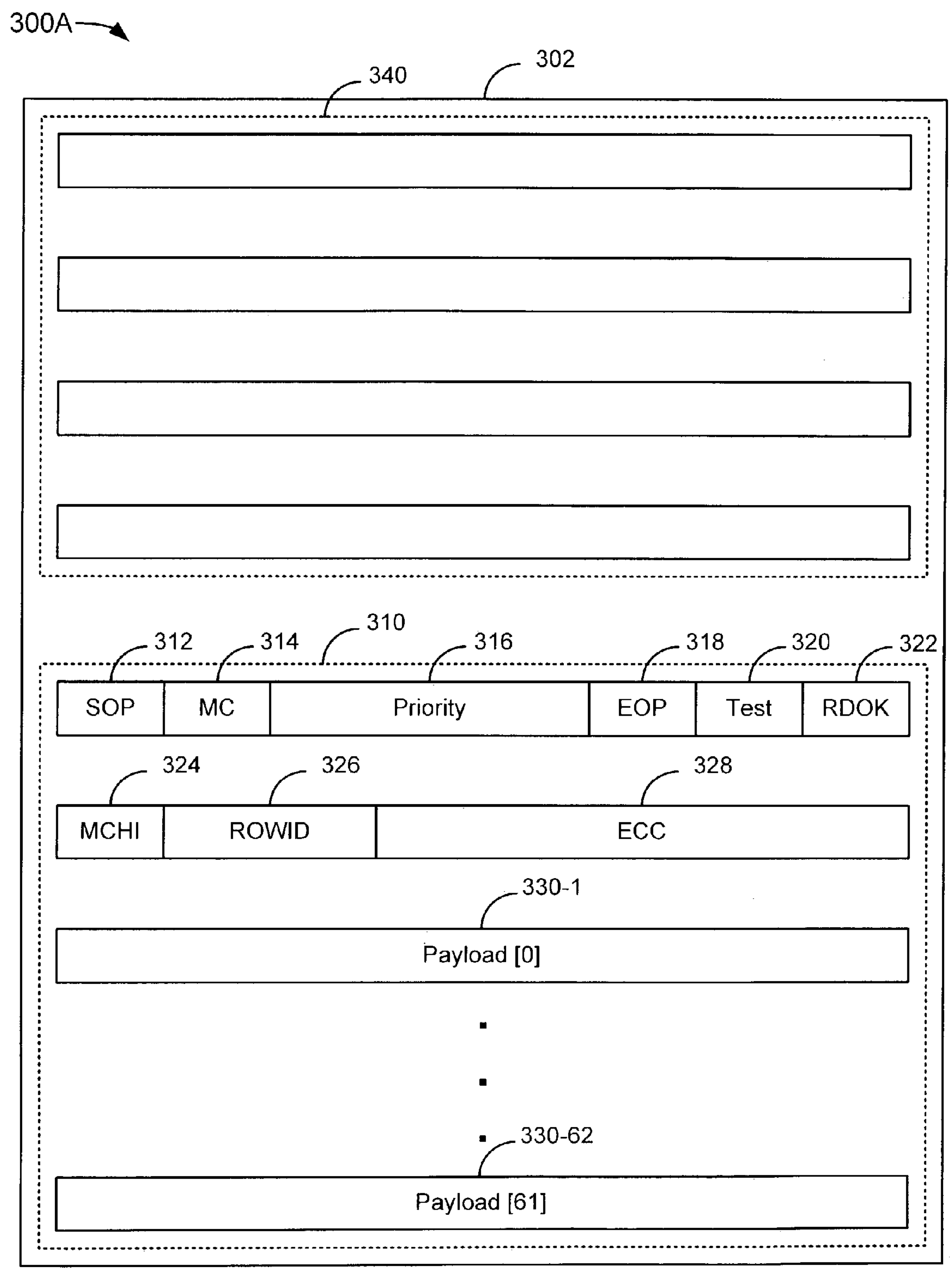
FIG. 3 is a block diagram of an exemplary cell for use with the system of FIG. 1 in an embodiment of the invention.
Figure 3B:
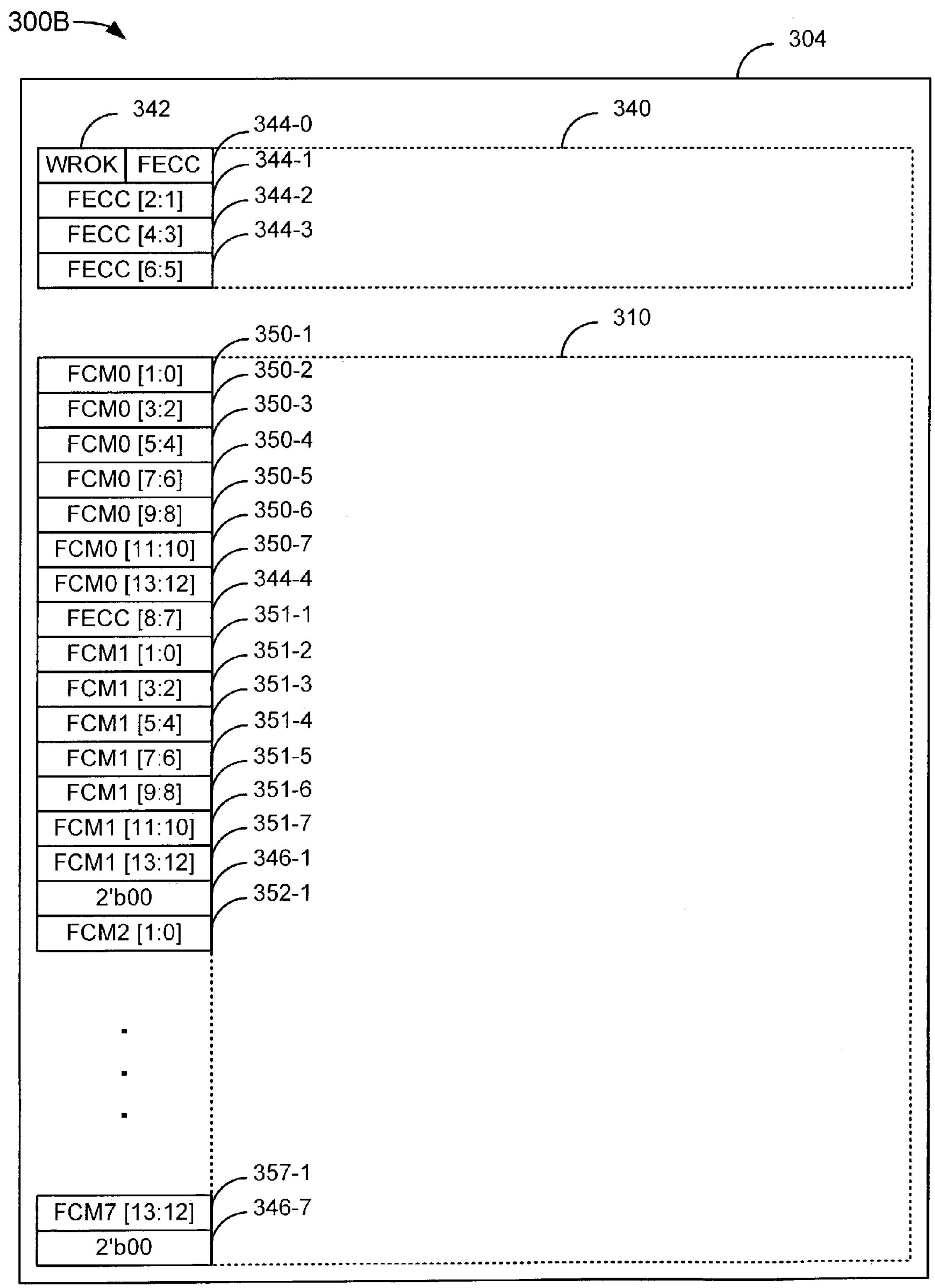

FIG. 3A is a block diagram of an exemplary cell 300A for use with the system of FIG. 1 in an embodiment of the invention. In an embodiment, the cell 300A is sent from the ingress module 206 (FIG. 2) to the switching fabric 230 (FIG. 2) on an 8-bit bus. The cell 300A includes 68 bytes 302, including a 4-byte header portion 340 and a 64-byte cell portion 310. The 64-byte cell portion 310 includes a start-of-packet (SOP) flag 312, a multicast (MC) flag 314, a priority field 316, an end-of-packet (EOP) flag 318, a test flag 320, a RDOK flag 322, a multicast high (MCHI) flag 324, a row identifier (ROWID)/continuation field 326, an error check and correct (ECC) field 328, and a payload 330-1 to 330-62 (collectively referred to as the payload 330). The SOP flag 312 is set if a packet is broken into portions and the payload 330 of the cell 300A includes the first portion of the packet. The MC flag 314 is set if the packet is multicast and not set if the packet is unicast. The priority field 316 contains the priority of the packet. In an embodiment, packets having different priorities are forwarded to and from and reassembled in different queues. The EOP flag 318 is set if the payload 330 of the cell 300 includes the last portion of the packet. In an embodiment, the EOP flag 318 is optional. The test flag 320 is set if the cell 300A includes a hardware test packet. Hardware test packets may be used to determine whether switching fabrics are available, or for other purposes. The RDOK flag 322 is set if reading of the cell 300A is allowed. The RDOK flag 322 is useful to ameliorate clock rate differences between modules. The MCHI flag 324 is used in conjunction with the header information the header portion 340, to identify a unique egress port. An understanding of the content of the additional header information is not necessary for the purposes of understanding this application. In an embodiment, the ROWID/continuation field 326 is a 2-bit rotating row identifier that is compared to the two least significant bits of a memory location into which the cell 300A is enqueued at the egress if the cell 300A is a unicast cell. A complete understanding of the function of the ROWID/continuation field 326 is not necessary for an understanding of this application. The ECC field 328 is used for error checking and correction. The payload 330 includes a packet or a portion of a packet.

FIG. 3B is a block diagram of an exemplary cell 300B for use with the system of FIG. 1 in an embodiment of the invention. In an embodiment, the cell 300B is sent from the switching fabric 130 (FIG. 1) to the egress module 108 (FIG. 1) on a bus having a 10-bit bandwidth. The cell 300B includes 68 10-bit fields 304, wherein the 4-byte header portion 340 (FIG. 3A) and the 64-byte cell portion 310 (FIG. 3A) make up 8 of the 10 bits. The egress module 108 forwards the remaining 2 (most significant) bits of the 10-bit field to the ingress module 106 (FIG. 1) located on the same packet processor module 102 (FIG. 1). In other words, the 2 most significant bits (MSBs) of the 10-bit field comprise a message that is sent from the switching fabric 130 to the ingress module 106 via the egress module 108. The 64-byte cell portion 310, on the other hand, is reassembled into a packet and the packet is forwarded through the interface 104 (FIG. 1) to the media module 152 (FIG. 1). The 2 MSBs of each of the 10-bit fields include a WROK flag 342/flow error check and correct (FECC) bit 344-0. The FECC bit 344-0, which represents bit 0 of a 9-bit FECC sequence, is used in conjunction with FECC bits 1 and 2 (FECC [2:1]) 344-1, FECC [4:3] 344-2, FECC [6:5] 344-3, and FECC [8:7] 344-4 (referred to collectively as the FECC 344). The WROK flag 342 is discussed with reference to FIG. 2, above. The 2 MSBs further include flow control message 0 first and second bits (FCM0 [1:0]) 350-1, FCM0 [3:2] 350-2, FCM0 [5:4] 350-3, FCM0 [7:6] 350-4, FCM0 [9:8] 350-5, FCM0 [11:10] 350-6, and FCM0

[13:12] 350-7 (referred to collectively as FCM0 350). The 2 MSBs further include FCM1 351 to FCM7 357, each 14 bits long. The bits of the FCM that have not yet been described, 14 bits in all, are taken up by 2'b00 bits 346-1 to 346-7. The FECC 344 is used to check and correct errors in the 8 FCM fields just described. Error detection and correction bits (not illustrated) associated with the WROK flag 342 are located in the 4-byte header portion 340.

Figure 4A:
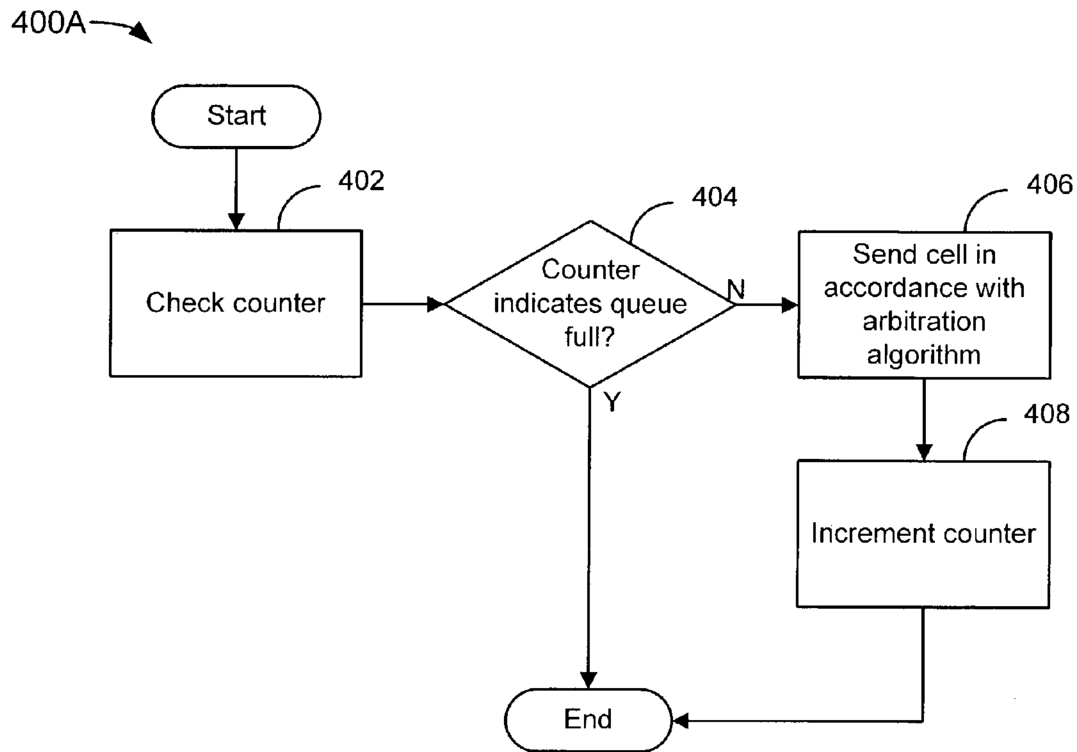
FIGS. 4A-4C are flowcharts of methods for controlling traffic flow in accordance with embodiments of the invention.
Figure 4B:
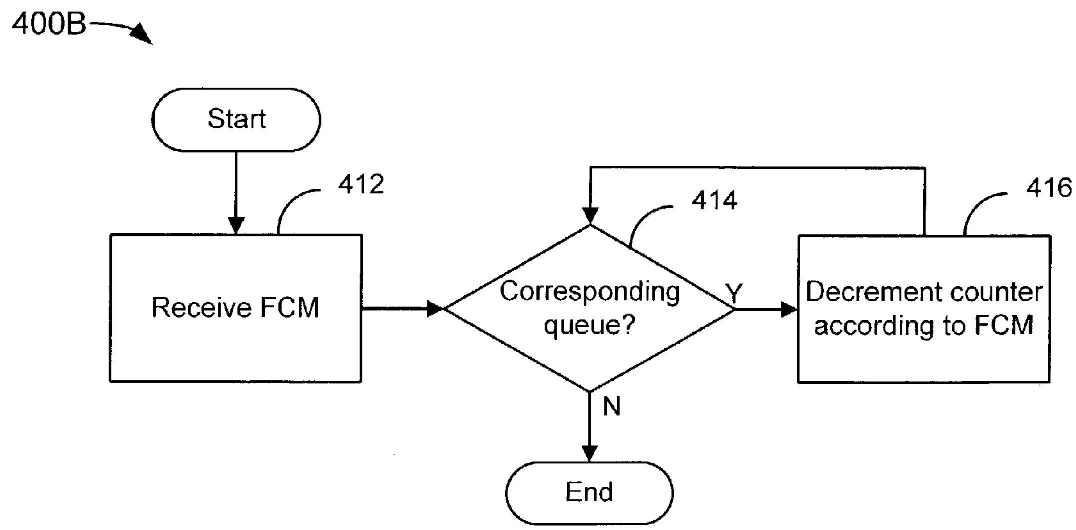
Figure 4C:
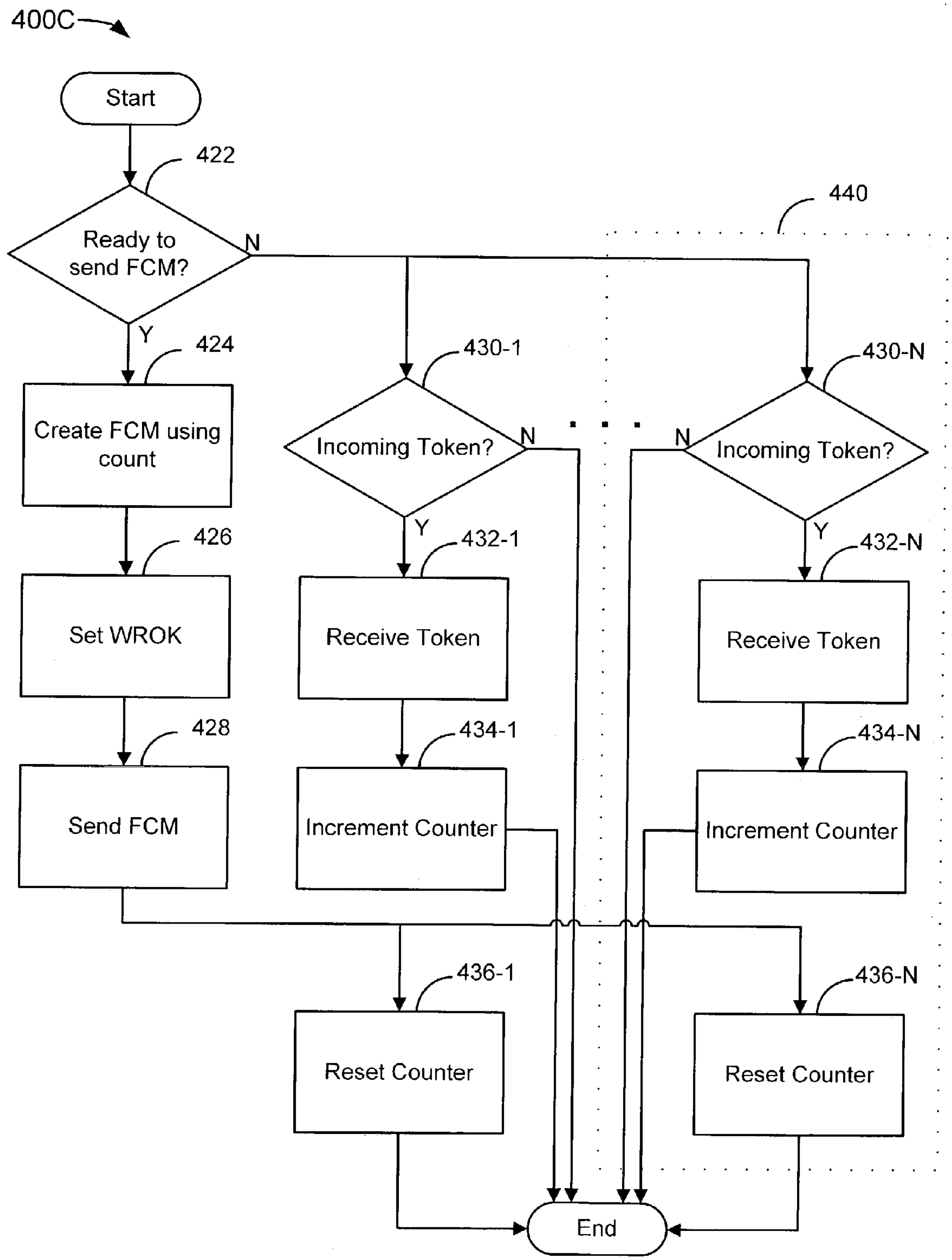

FIGS. 4A-4C are flowcharts 400A-400C of methods for controlling traffic flow across a switching fabric in accordance with an embodiment of the invention. Flowchart 400A is intended to illustrate the use of write counters when sending a cell from an ingress to a switching fabric. Flowchart 400B is intended to illustrate the use of FCMs from a switching fabric to decrement write counters associated with switching fabric queues at an ingress. Flowchart 400C is intended to illustrate the aggregation of flow control information at a switching fabric.

The flowchart 400A is assumed to start only if a cell is available for forwarding from an ingress to a switching fabric. The flowchart 400A starts at step 402 with checking a counter associated with a queue of a switching fabric. Since each cell targets a specific queue in a switching fabric, it is possible to determine whether the queue is full before sending a cell. Accordingly, at decision point 404, it is determined whether the queue is full. It should be noted that even if the counter indicates that a queue is full, the queue may or may not be full. One reason for the discrepancy between the counter and the queue is that there is a lag between the time that a queue forwards a cell and the time the counter is decremented to represent the fullness of the queue. If it is determined that the queue is full, the cell cannot be sent and the flowchart 400A ends. In this case, the ingress will likely send a different cell in accordance with an arbitration algorithm. In other words, just because a first cell cannot be sent because a first queue is full does not mean that a second cell cannot be sent to a second queue. Of course, the other cells must not target full queues, either. If, instead, it is determined that the queue is not full, the cell is sent in accordance with the arbitration algorithm at step 406. It should be noted that multiple cells are typically in contention for sending to the switching fabric. Accordingly, a cell that targets a queue that is not full must still win arbitration. When a cell is sent to the switching fabric, the counter that corresponds to the queue targeted by the cell is incremented at step 408 and the flowchart 400A ends.

The flowchart 400B starts with receiving a FCM at step 412. The FCM is received by an ingress from a switching fabric. The FCM includes information associated with one or more queues in the switching fabric. At decision point 414, it is determined which counter corresponds to the one or more queues. The corresponding counter is decremented according to the FCM at step 416. The amount the counter is decremented by depends upon the FCM itself. In one embodiment, the FCM causes the counter to be decremented by up to 7, which would indicate that the queue can hold 7 more cells. Step 416 is repeated as long as it is determined that another counter corresponds to one of the queues at decision point 414. When all appropriate counters have been decremented in accordance with the FCM, the flowchart 400B ends.

The flowchart 400C starts at decision point 422 with determining whether an aggregation unit is ready to send a FCM. If the aggregation unit is not ready to send a FCM (e.g., because bandwidth is limited), then if a token is incoming at decision point 430-1, the token is received at step 432-1, a counter (initially zero) is incremented at step 434-1, and the flowchart 400C ends. The token, in this case, represents one dequeuing of a cell from a queue. The counter represents the number of cells that have been dequeued from the queue since the last FCM was sent. Accordingly, the counter is incremented in response to the token. Thus, instead of sending a FCM each time a cell is dequeued, the number of times a cell is dequeued is aggregated using the counter. By aggregating the number of cells dequeued from the queue, certain information associated with a FCM, such as an identifier for the queue, need not be repeated each time a FCM is generated. After an optional time lag, the flowchart 400C starts again with the counter at the newly incremented value. If at decision point 422 it is determined that the aggregation unit is ready to send a FCM, then a FCM is created using the counter at step 424. After creating the FCM, the WROK is set, which may require a time lag, at step 426, the FCM is sent at step 428, the counter is reset to its initial value at step 436-1, and the flowchart 400C ends. In an embodiment, the counter is reset to zero. Accordingly, the counter represents the number of cells that have been dequeued from a queue since the last time a FCM was created.

It should be noted that the counter described with reference to FIGS. 400A and 400B may be referred to as a write counter because, from the perspective of the switching fabric, the counter indicates how many cells have been written to (and remain in) a queue. The counter described with reference to FIG. 400C, however, may be referred to as a read counter because the counter indicates how many cells have been read from a queue since the last time the read counter was reset.

In another embodiment that includes optional steps 440 (decision point 430-N, step 432-N, step 434-N, and step 436-N), multiple counter values are incorporated into the FCM at step 424. The optional steps 440 are similar to steps 430-1 to 436-1 and are performed approximately in parallel with steps 430-1 to 436-1. If two counters are incorporated into the FCM, then there is one set of optional steps 440. More generally, for N counters incorporated into a single FCM, there are N-1 optional steps 440. Pairing two or more queues in a single FCM allows for further compression. For example, assume that a first queue and a second queue have 6-bit identifiers where 5 of the bits are the same and only 1 of the bits is different (i.e., '0' for the first queue and '1' for the second queue). In this example, 5 of the bits may be included in the FCM as a queue set identifier (where the queue set includes the first and second queues), and the counters associated with the two queues may be distinguished using the different bit (i.e., '0' or '1') that together with the queue set identifier uniquely identifies the first queue and the second queue. Any number of queues could theoretically be combined in this manner by decreasing the number of bits in the queue set identifier. Naturally, queue sets with sizes that are not a power of two would be more difficult to incorporate, though this is not impossible.

In one embodiment, the method steps described above are embodied in a computer-readable media as computer instruction code. It shall be appreciated that not all methods steps described must be performed, nor must they be performed in the order stated.

The term packet is defined broadly to include fixed-length cells, variable length packets, and encapsulated data. A packet could be broken into a plurality of smaller cells. As used herein, the term packet could refer to a flow of the plurality of cells or a single cell of such a flow.

Although specific embodiments of the invention have been described and illustrated, the invention is not to be limited to the specific forms or arrangements of parts as described and illustrated herein. The invention is limited only by the claims.

What is claimed is:

1. A method of controlling traffic flow across a switching fabric, comprising:

receiving cells at the switching fabric from an ingress of a first packet processor module coupled to the switching fabric;

enqueuing the cells in a plurality of queues within the switching fabric;

dequeuing the cells from the plurality of queues;

forwarding the cells to an egress of a second packet processor module;

aggregating respective numbers of cells dequeued for each queue;

sending a flow control message (FCM) from the switching fabric to the ingress of the first packet processor module, in accordance with a scheduling algorithm, wherein the FCM comprises one or more of the respective numbers of cells dequeued;

resetting the one or more respective numbers of cells dequeued;

combining the FCM and at least one of the cells, wherein said sending further includes directing the FCM from the switching fabric toward the ingress of the first packet processor module via the egress of the second packet processor module;

separating the FCM and the at least one cell at the egress;

using the FCM to decrement write counters at the ingress;

reassembling a packet using the cell; and send the packet from the egress.

2. The method of claim 1, further comprising:

sending the FCM when the one or more respective numbers of cells dequeued are less than two if bandwidth is available.

3. The method of claim 1, further comprising:

incorporating the identity of a queue into the FCM.

4. The method of claim 1, further comprising:

incorporating the identity of a queue set into the FCM, wherein the queue set comprises a subplurality of the plurality of queues.

5. The method of claim 1, wherein an ingress clock is faster than a switching fabric clock, further comprising:

comparing the ingress clock and the switching fabric clock, wherein the ingress clock is associated with the ingress and the switching fabric clock is associated with the plurality of queues; and indicating in the FCM that the ingress is permitted to write to at least one of the plurality of queues based on said comparing.

6. The method of claim 1, wherein a switching fabric clock is faster than an egress clock, further comprising:

comparing the switching fabric clock and the egress clock, wherein the switching fabric clock is associated with the plurality of queues and the egress clock is associated with the egress; and indicating that the egress is able to receive at least one of the cells based on said comparing.

7. A traffic flow control system, comprising:

a switching fabric comprising:

a plurality of queues, configured to facilitate the queuing of cells, respectively associated with a plurality of write counters representing a number of cells enqueued in the plurality of queues and a plurality of read counters representing a number of cells dequeued from the plurality of queues;

a flow control aggregation unit, coupled to the plurality of queues, configured to:

increment a first read counter of the plurality of read counters when a first cell is dequeued from a first queue of the plurality of queues, wherein the first read counter is associated with the first queue; and create a flow control message (FCM) using the first read counter;

a scheduling module configured to schedule the FCM for transmission from the switching fabric;

a packet processor module, coupled to the switching fabric, comprising: an ingress module configured to:

send the first cell to the switching fabric for enqueuing in the first queue;

increment a first write counter associated with the first queue when the first cell is sent;

receive the FCM;

decrement the first write counter according to the first read counter of the FCM;

the packet processor module further comprising: an egress module configured to:

receive cells, including the first cell, and the FCM from the switching fabric;

reassemble a packet from the cells, including the first cell; and forward the FCM to the ingress module.

8. The system of claim 7 further comprising:

a first bus, coupled between the ingress module and the switching fabric, configured to transport the cells from the ingress module to the switching fabric;

a second bus, coupled between the switching fabric and the egress module, configured to transport the cells and the FCM from the switching fabric to the egress module; and a third bus, coupled between the egress module and the ingress module, configured to transport the FCM from the egress module to the ingress module.

9. The system of claim 7, the switching fabric further comprising:

a transmit module configured to combine the first cell and the FCM and transmit the combined first cell and FCM from the switching module to an egress of a packet processor module coupled to the switching fabric.

10. The system of claim 7, the scheduling module further comprising:

a scheduling algorithm configured to schedule the FCM if bandwidth is available and delay scheduling the FCM until a read counter is incremented if bandwidth is constrained.

11. The system of claim 7, the flow control aggregation unit further comprising:

an aggregation algorithm configured to include in the FCM a subplurality of the plurality of read counters associated with a respective subplurality of the plurality of queues.

12. The system of claim 7 further comprising:

a switching fabric clock associated with said switching fabric;

an ingress clock associated with said ingress module; and a clock comparison module configured to generate a write okay flag in accordance with a comparison of the switching fabric clock and the ingress clock, wherein the flow control aggregation unit is further configured to include the write okay flag in the FCM.

13. The system of claim 7, the switching fabric further comprising:

a switching fabric clock associated with said switching fabric;

an egress clock associated with said egress module; and a clock comparison module configured to generate a read okay flag in accordance with a comparison of the switching fabric clock and the egress clock.

* * * * *